United States Patent
Buckley et al.

(10) Patent No.: US 10,346,225 B2
(45) Date of Patent: Jul. 9, 2019

(54) SYNTHESIZED MODULES FOR MODULE RENAMING

(71) Applicant: Oracle International Corporation, Redwood Shores, CA (US)

(72) Inventors: Alexander R. Buckley, Cupertino, CA (US); Alan Bateman, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/704,156

(22) Filed: Sep. 14, 2017

(65) Prior Publication Data

US 2019/0079811 A1 Mar. 14, 2019

(51) Int. Cl.
*G06F 9/54* (2006.01)
*G06F 9/455* (2018.01)

(52) U.S. Cl.
CPC .......... *G06F 9/542* (2013.01); *G06F 9/45525* (2013.01); *G06F 9/45533* (2013.01); *G06F 2209/463* (2013.01)

(58) Field of Classification Search
CPC ...................................................... G06F 9/542
USPC ................................................ 717/162–178
See application file for complete search history.

(56) References Cited

U.S. PATENT DOCUMENTS

| | | | | |
|---|---|---|---|---|
| 5,237,670 A | * | 8/1993 | Wakerly | G06F 13/36 710/100 |
| 5,586,328 A | * | 12/1996 | Caron | G06F 8/48 717/112 |
| 5,946,486 A | * | 8/1999 | Pekowski | G06F 11/3612 714/E11.212 |
| 7,685,577 B2 | * | 3/2010 | Pace | G06F 8/60 717/103 |
| 2007/0033273 A1 | * | 2/2007 | White | G06F 8/30 709/223 |

OTHER PUBLICATIONS

Stewart, David B. "Twenty-five most common mistakes with real-time software development." Proceedings of the 1999 Embedded Systems Conference (ESC'99). vol. 141. 1999.pp. 1-13 (Year: 1999).*

Wilde, Norman, Ross Huitt, and Scott Huitt. "Dependency analysis tools: reusable components for software maintenance." Software Maintenance, 1989., Proceedings., Conference on. IEEE, 1989.pp. 126-131 (Year: 1989).*

Hautus, Edwin. "Improving Java software through package structure analysis." IASTED International Conference Software Engineering and Applications. 2002.pp. 1-5 (Year: 2002).*

* cited by examiner

*Primary Examiner* — Satish Rampuria
(74) *Attorney, Agent, or Firm* — Invoke

(57) ABSTRACT

Techniques for renaming a module in a module system are disclosed. It is determined that a first module is declared with a corresponding first module name. It is determined that the first module is associated with a second module name. Responsive to determining that the first module is associated with the second module name: a second module declared with the second module name is synthesized, and a dependency of the second module, with the second module name, is declared on the first module with the first module name.

19 Claims, 10 Drawing Sheets

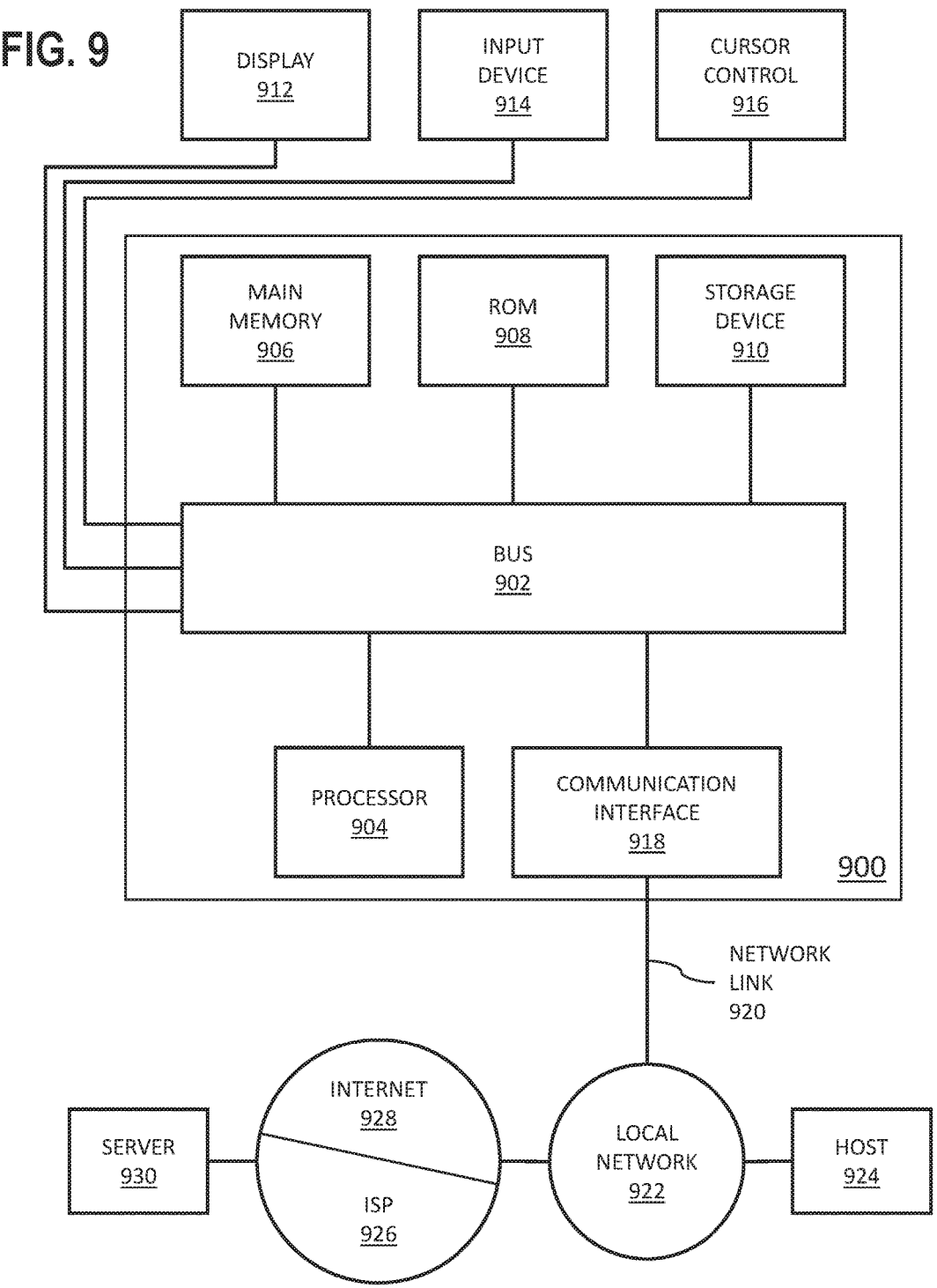

SYNTHESIZED MODULES FOR MODULE RENAMING

TECHNICAL FIELD

The present disclosure relates to modules. In particular, the present disclosure relates to renaming modules.

BACKGROUND

A module in a module system is associated with a particular name. Modules refer to each other by their respective names. For example, one module may declare a dependency on another module, referring to the depended-upon module by name. However, a module may be renamed. For example, a module may be generated using an automatically assigned name (e.g., assigned by an integrated development environment (IDE)) and may later be renamed using a user-assigned name. As another example, a company may be acquired and subsequently change its module names to reflect the acquisition. Many different reasons for renaming a module exist.

When a module's name changes, consumers of that module (e.g., other modules depending on that module) may break, i.e. cease to function properly, if the consumers are not edited to reference the new module name. Specifically, when a consumer attempts to access a module using its old name, an error may be generated and/or the consumer may encounter errors when attempting to reference the module using its old name. Editing every reference to an old module name, in each of the module's consumers, may be time-consuming, expensive, and/or simply impractical. For example, the developers of a module that is released for use by other developers generally do not have access to edit consuming modules' code.

One approach to renaming a module may be to declare multiple names for that particular module. In other words, the module system may include a single module that can be referenced by multiple names. However, allowing a single module to have multiple names may require the programming environment, compiler, and/or runtime environment to keep track of the multiple names and ensure that references to each of those names resolve to the same module. Thus, allowing a single module to be have multiple names may be resource-intensive and/or error-prone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 EXAMPLE CLASS FILE STRUCTURE
2.2 EXAMPLE VIRTUAL MACHINE ARCHITECTURE
2.3 LOADING, LINKING, AND INITIALIZING
2.4 MODULE AND NON-MODULE ENVIRONMENTS
3. RENAMING A MODULE
4. ILLUSTRATIVE EXAMPLES
5. MISCELLANEOUS; EXTENSIONS
6. HARDWARE OVERVIEW
7. COMPUTER NETWORKS AND CLOUD NETWORKS
8. MICROSERVICE APPLICATIONS

1. General Overview

One or more embodiments include techniques for renaming a module in a module system. It is determined that a first module is declared with a corresponding first module name. It is determined that the first module is associated with a second module name. Responsive to determining that the first module is associated with the second module name: a second module declared with the second module name is synthesized, and a dependency of the second module, with the second module name, is declared on the first module with the first module name.

One or more embodiments described in this Specification and/or recited in the claims may not be included in this General Overview section.

2. Architectural Overview

Figure 1:
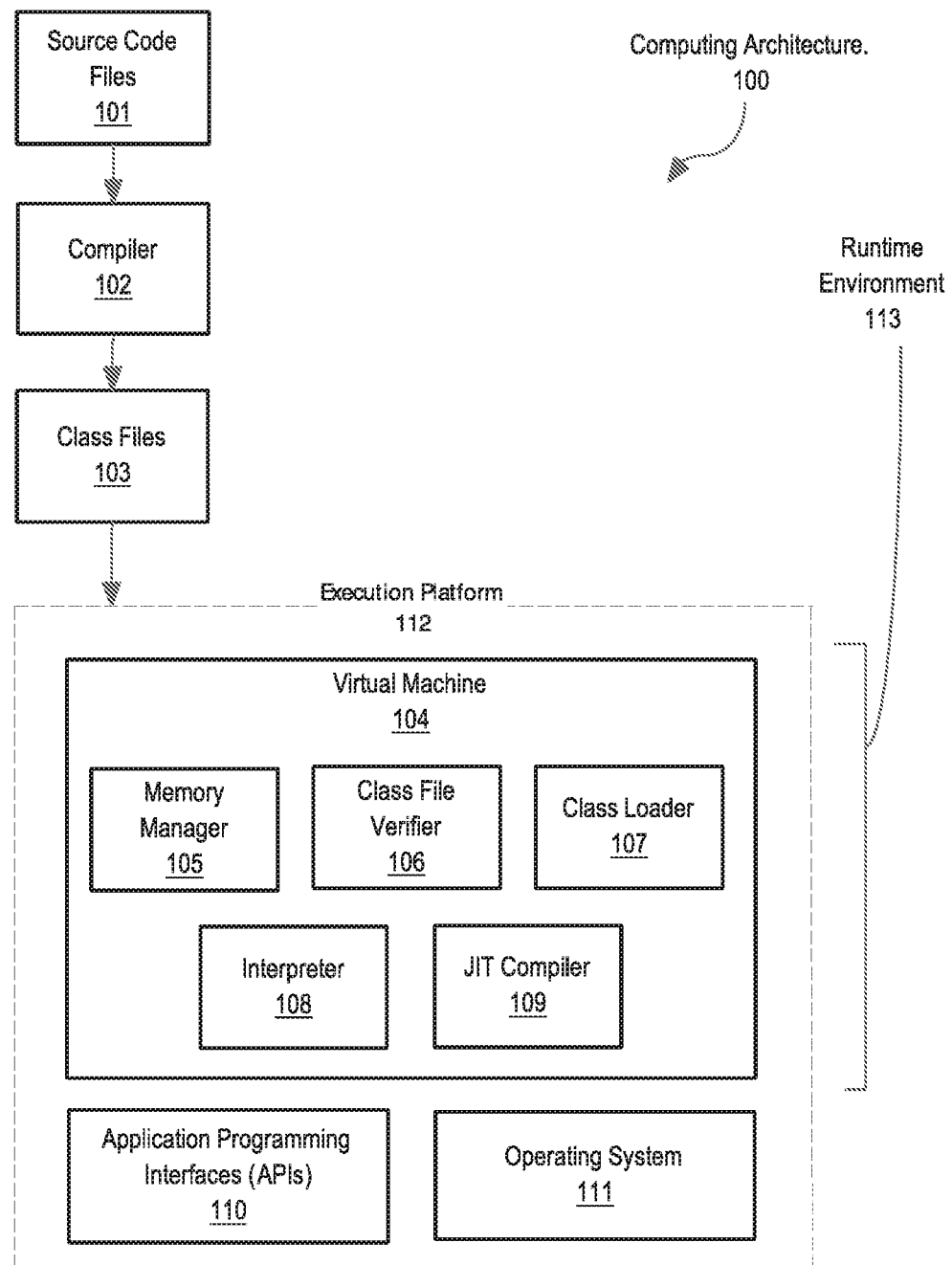
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
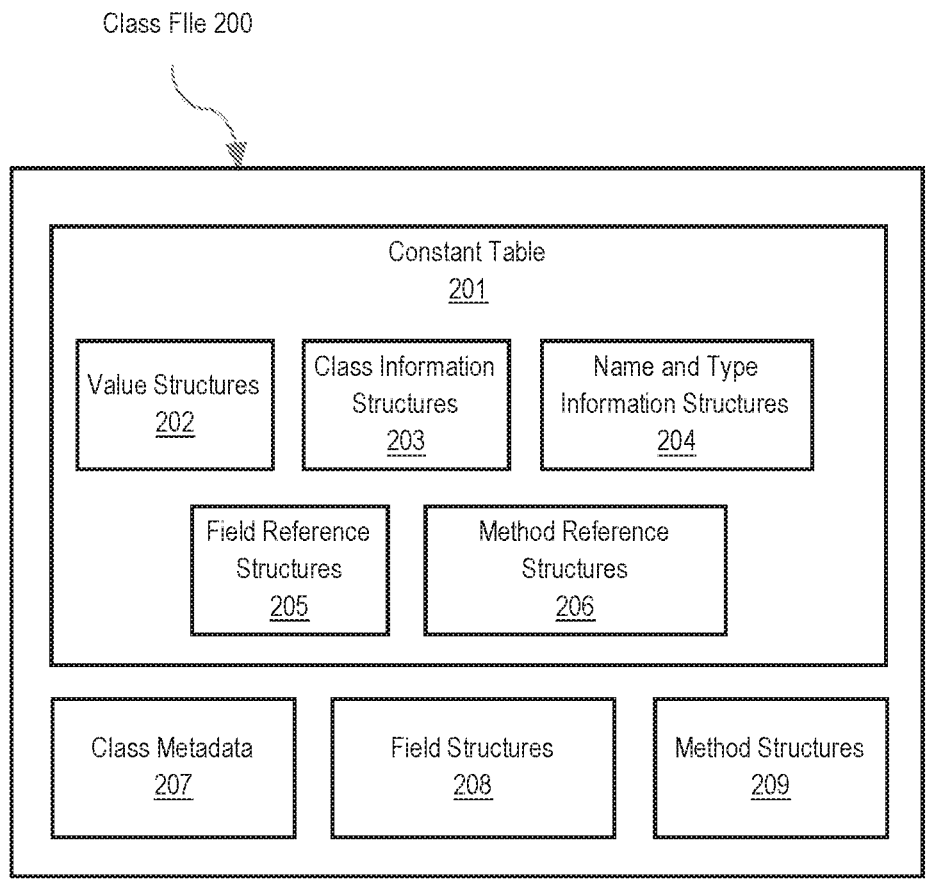
FIG. 2 is a block diagram illustrating an embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
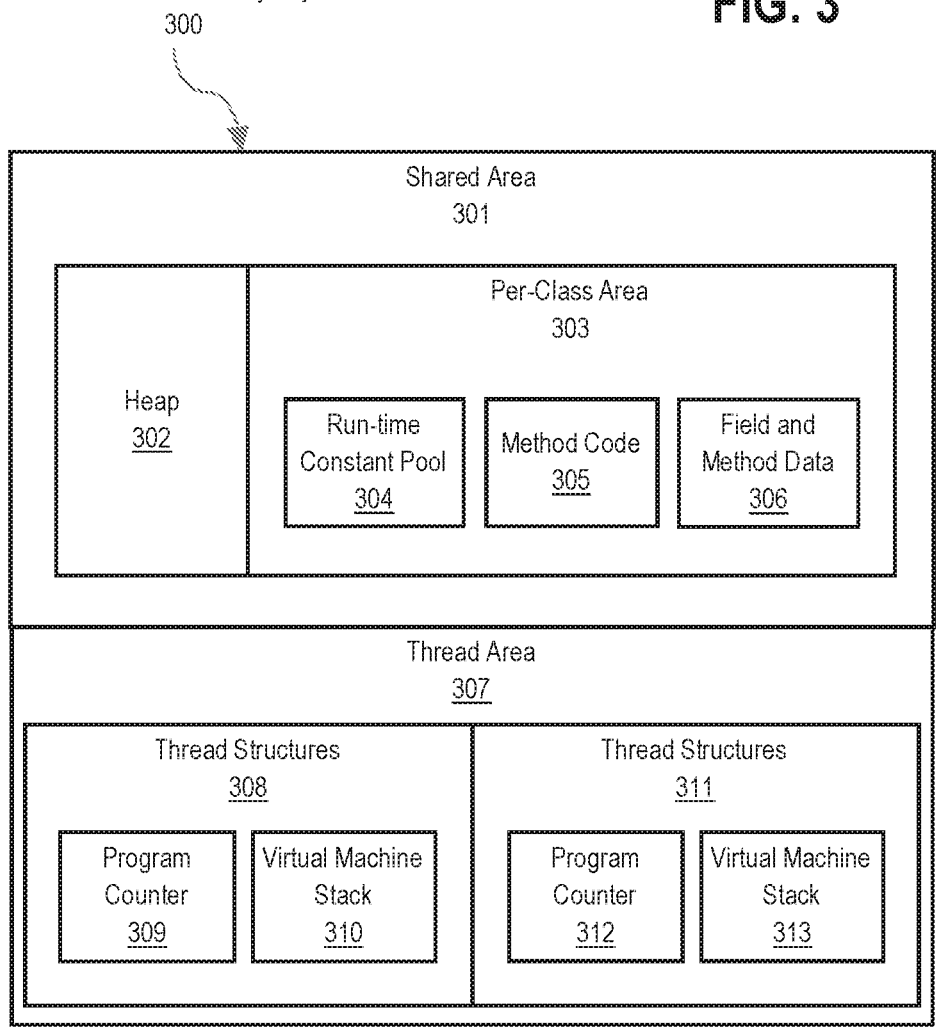
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
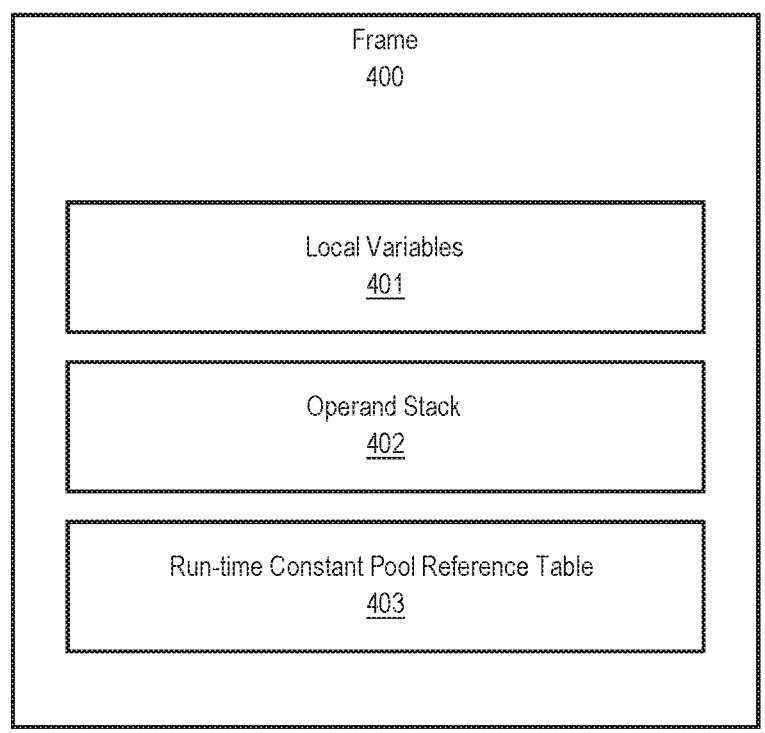
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack

402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

2.4 Module and Non-Module Environments

Computing platforms for developing and maintaining software generally rely on one of two kinds of systems: non-module systems and module systems.

A non-module system refers to a system in which dependencies between different pieces of code are not strictly declared or restricted. An industry-defined term "JAR hell" refers to example uses of Java Archive (JAR) files in a non-module system which result in problems, for example, with the class loading process.

A module system includes a collection of named modules and defines how the collection of named modules work together. Each particular named module in the collection of named modules may explicitly define dependencies on other named modules (or the contents thereof). However, named modules are typically restricted from explicitly depending on any non-module code.

Figure 5:
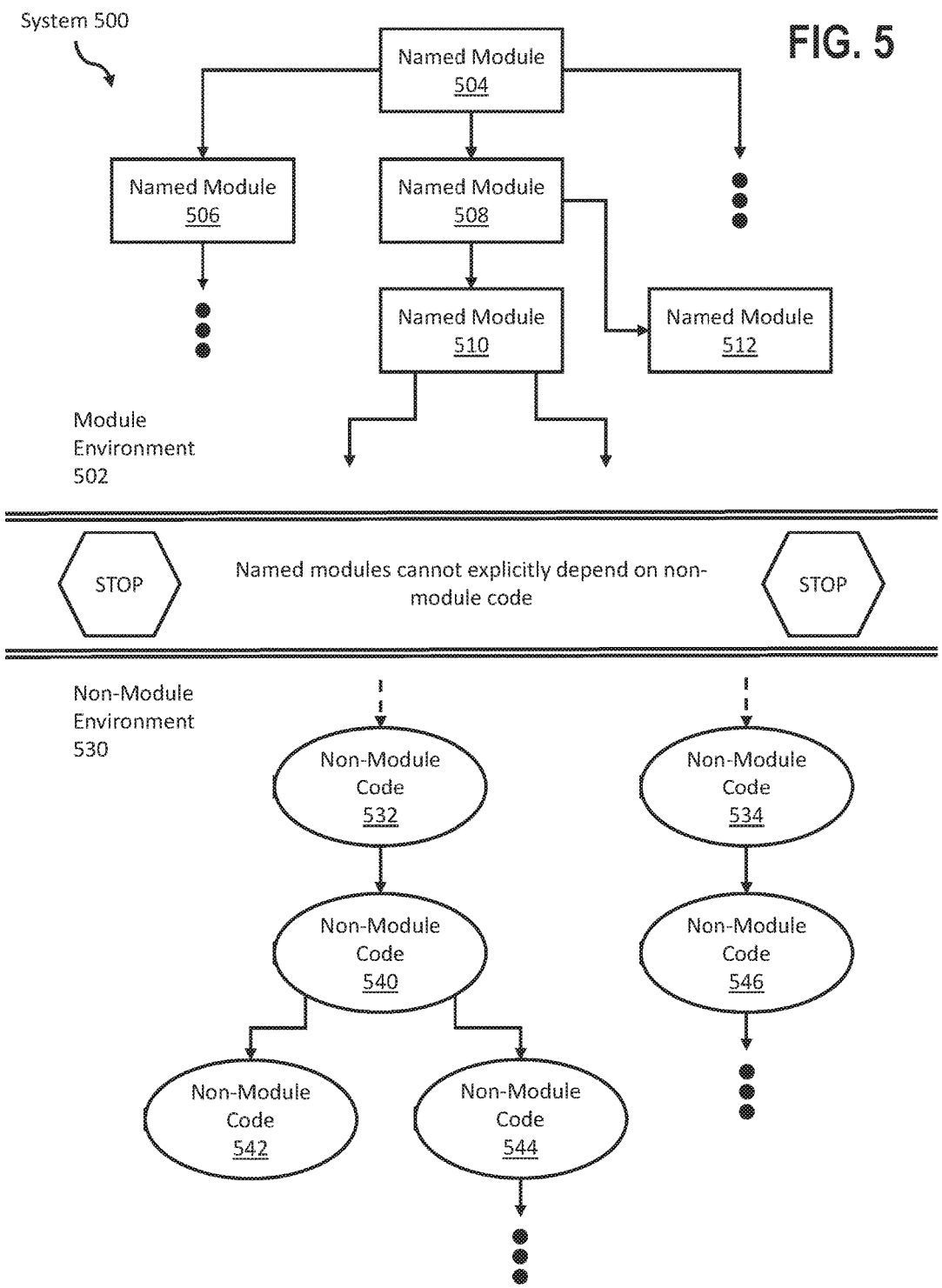
FIG. 5 illustrates named modules in a module environment and non-module code in a non-module environment, in accordance with one or more embodiments.

FIG. 5 illustrates examples of systems in accordance with one or more embodiments. Other embodiments may include more or fewer devices and more or fewer components than illustrated in the systems and/or described below. Hardware components, software components, and/or functionality described as corresponding to one device may instead correspond to another device. Components illustrated separately may be combined into a single component or implemented on a single device. Accordingly, the scope of the claims should not be construed as being limited by the specific examples herein.

As illustrated in FIG. 5, a system 500 includes components of a module environment 502 and components of a non-module environment 530. The non-module environment 530 includes non-module code 532-546. Dependencies between different non-module code are not required to be explicitly declared. Accordingly, when a first non-module code depends on a second non-module code, the software development environment must search for the second non-module code in all files of a set of files associated with all of the code. The dependencies between different non-module code (which may not be explicitly declared) are illustrated in FIG. 5 using arrows. For example, the dependency of non-module code 532 on non-module code 540 is illustrated using an arrow beginning at non-module code 532 and ending at non-module code 540. Furthermore, a dependency of non-module code 540 on non-module code 542 and non-module code 544 is illustrated using two arrows beginning at non-module code 540 and ending at non-module code 542 and non-module code 544, respectively.

The module environment 502 includes a set of named modules (e.g., named modules 504-512). Dependencies between different named modules in a module environment, such as module environment 502, are explicitly declared by the modules. An explicitly declared dependency may be referred to herein as an "explicit dependency." The explicit dependencies between different named modules (or contents thereof) in module environment 502 are also illustrated using arrows. For example, the explicit dependency of named module 504 on named module 508 is illustrated using an arrow starting at named module 504 and ending at named module 508. Further, the explicit dependency of named module 508 on named module 510 is illustrated using an arrow starting at named module 508 and ending at named module 510.

As illustrated in FIG. 5, there is a partition between module environment 502 and non-module environment 530. Specifically, named modules cannot explicitly depend on non-module code. For example, named module 510 cannot explicitly depend on non-module code 532. As a result, module environments comprising named modules cannot be built on top of non-module environments comprising non-module code.

In the Java Module System, a keyword "requires" is used to declare explicit dependencies. The keyword "requires" may be used with a parameter identifying another component or identifying a dependency path (e.g., CLASSPATH). An explicit dependency on a dependency path allows for depending on the parameters associated with the dependency path. In an example, a first component depends on a second component, either directly or via a dependency path.

In addition, the ability of a first module to access particular module code in a second module may be contingent on the second module exposing the particular module code to the first module. For example, the second module may include two packages. The second module may expose one of the packages to the first module, but not the other package. In this example, the first module may be able to access code in the exposed package, but not in the non-exposed package. In the Java Module System, an "exports" keyword is used to expose module elements to other modules.

3. Renaming a Module

Figure 6A:
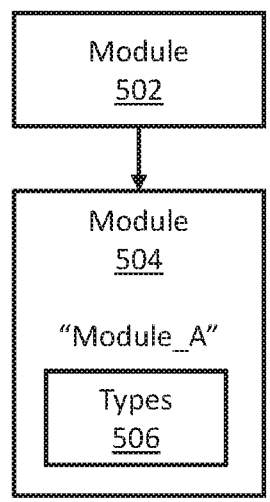
FIGS. 6A and 6B illustrate an example of renaming a module in accordance with one or more embodiments.
Figure 6B:
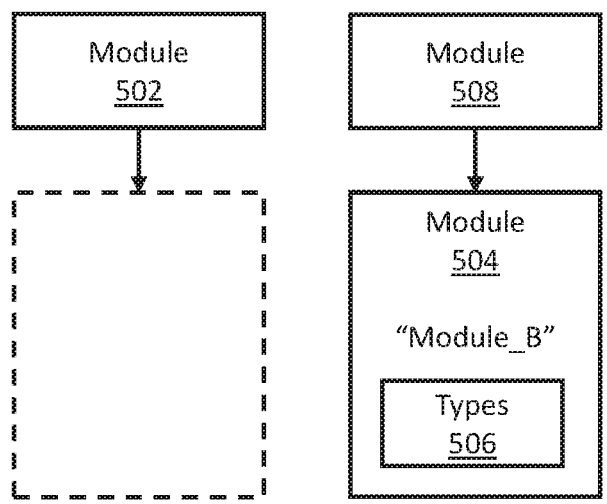

As discussed above, a module in a module system may be renamed. FIGS. 6A and 6B illustrate an example of renaming a module in accordance with one or more embodiments. Specifically, FIGS. 6A and 6B illustrate an example of renaming a module using a technique that may generate an error. The illustrations shown in FIGS. 6A and 6B are provided for exemplary purposes only and should not be construed as limiting one or more embodiments.

As shown in FIG. 6A, a module system includes two modules: module 502 and module 504. Module 502 depends explicitly on module 504 and uses types 506 exposed by module 504. In other words, module 502 is a consumer of module 504, and specifically of its types 506. In FIG. 6A, module 504 has been declared, or is otherwise associated with, the name "Module_A." Thus, module 504 consumes module 504 by referencing the name "Module_A."

FIG. 6B illustrates a result of renaming module 504. Instead of "Module_A," module 504 now is associated with the name "Module_B." Module 504 may have been renamed by changing its module declaration or otherwise changing its association with the name "Module_A" to an association with the name "Module_B." No record of the name "Module_A" is retained. Thus, as illustrated by the empty box with dashed lines, if module 502 attempts to reference module 504 by the old name "Module_A," it will not be able to access the types 506 of module 504. However, a different module 508 that references module 504 by its new name "Module_B" is able to access the types 506 of module 504.

In an embodiment, renaming module 504 in this manner may result in a compile-time or load-time error. For example, the module system may identify the error when attempting to generate a dependency graph for the modules in the module system. The fact that module 502 attempts to depend on module 504 using the old name "Module_A" may cause the module system to generate an error and/or cease to operate entirely. Alternatively, if the error is not identified at compile-time or load-time, the module system may encounter a runtime error when module 502 attempts to consume the types 506 from module 504 using the old name.

Figure 7:
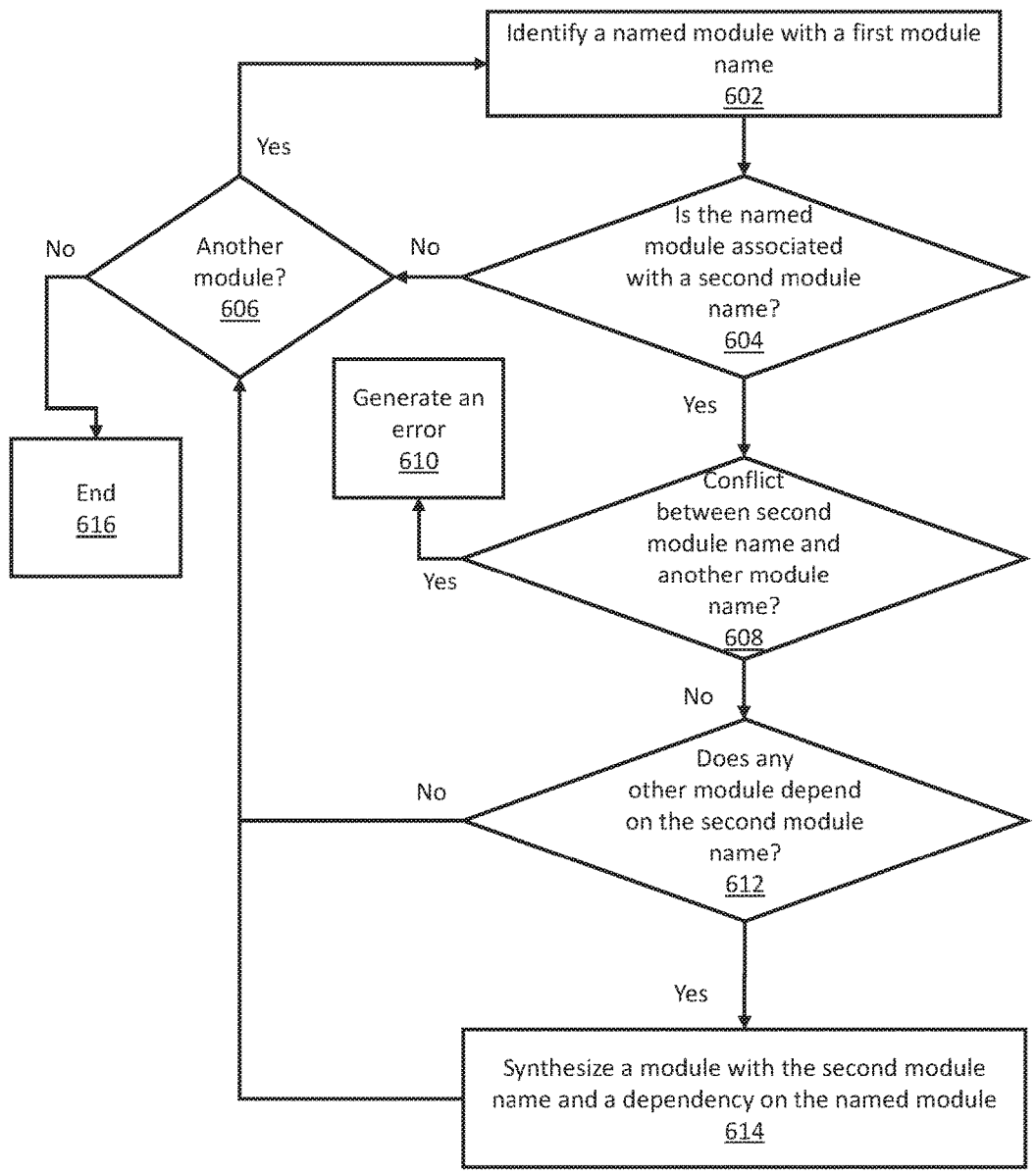
FIG. 7 illustrates a set of operations for renaming modules in accordance with one or more embodiments.

FIG. 7 illustrates an example set of operations for renaming a module in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

In an embodiment, a named module with a first module name is identified (Operation 602). In this example, terms such as "first," "second," etc. are merely used to differentiate between different elements and do not necessarily imply any type of temporal or logical ordering. In addition, while the module identified in Operation 602 is referred to as the "named module," other modules in the module system (including synthesized modules) also have names and may likewise be considered named modules. The module and its corresponding module name may be identified during software development. For example, an integrated development environment (IDE) may identify modules and their corresponding names during development of modules for a software system. Alternatively, the module and its corresponding module name may be identified at compile-time. For example, a compiler may identify modules and their corresponding names while converting source code to bytecode and/or machine-level code. Alternatively, the module and its corresponding module name may be identified during a process of archiving a module. For example, in a Java environment, the JAR command may identify modules and their corresponding names while compiling module source code to Java bytecode. Alternatively, the module and its corresponding module name may be identified at load-time. For example, a command to load and execute a module system may identify modules and their corresponding module names. The command may start loading modules from an initial "main" module and generate a dependency graph of the modules in the module system, in the course of which the modules and their corresponding module names are identified. Alternatively, the module and its corresponding module name may be identified at runtime, i.e., during execution of modules in a module system. The module system may support the introduction of modules at runtime, for example via a runtime service binding. The module system may identify the module and its associated name upon introduction of the module to the runtime module system. The module name may be identified based on its inclusion in a module declaration, a module descriptor, or any other place where a module name may be stored and subsequently identified.

In an embodiment, a determination is made of whether the module, in addition to being associated with the first module name, is also associated with a second module name (Operation 604). The determination of whether a module is associated with a second module name may be made during development, at compile-time, during archiving, at load-time, and/or at runtime, as described above. In an embodiment, if a module is associated with both a first module name and a second module name, the module may have been renamed from one of the names to the other. The module may be associated with the second module name in many different ways. For example, the second module name may be included in a module declaration, a module descriptor, a command line argument (e.g., to an archive tool) or any other place where a module name may be stored and subsequently identified. As another example, a process examining the module may transmit a query to a naming authority (e.g., a database, a web service, or any other type of lookup resource) that identifies a naming history for the module, based on its current name. The naming history, obtained from the lookup, may indicate that the module has previously been known by one or more other names. A module may be associated with more than two names, for example, if the module has been renamed more than once.

As noted above, a module may be associated with two different names, and the two names may be identified from the module's declaration. For example, a declaration such as the following may be used:

```
module A aka B {
    // module contents
}
```

In the example above, "A" may be the old module name and "B" may be the new module name. Alternatively, "B" may be the old module name and "A" may be the new module name. Depending on implementation details, either module name may be thought of as the "first module name" or "second module name" for purposes of this discussion. Embodiments should not be considered limited to identifying module names in module declarations, or to any particular format of module declaration.

In an embodiment, if the module is associated with a first module name and not associated with a second module name, then the module has not been renamed and a determination is made of whether there is another module to be examined (Operation 606). For example, the determination may be made during traversal of a module dependency graph. If there is another module to be examined, then the process is repeated for that module. If no more modules are to be examined, then the renaming process ends (Operation 616).

Returning to Operation 604, in an embodiment, if a module associated with a first module name is also associated with a second module name, a determination is made of whether there exists a conflict between the second module name and another module name (Operation 608). Specifically, the module system may reference a list or other representation of all known module names in the module system and determine whether the second module name is identical to another known module name. In an embodiment, the module system only allows a single module to have a particular module name. Accordingly, if there is a conflict between the second module name and another module name, an error may be generated (Operation 610). Depending on when the conflict is identified (i.e., during development, compiling, archiving, loading, or runtime), different types of errors may be generated. The error may involve a warning to a developer that the conflict exists. If the error is generated at runtime, it may be logged in a runtime logging system. Alternatively or in addition, the module system may terminate upon generating the error.

In an embodiment, a determination is made of whether any other module depends on the second module name (Operation 612). In other words, a determination may be made about whether any other module consumes the module and/or its types using the second module name. In an embodiment, synthesizing a module with the second module name (i.e., Operation 614, described below) is performed only if the second module name is actually referenced by another module in the module system. Accordingly, if no other module depends on the second module name, the renaming process may end for this module. A determination may be made of whether there is another module to be examined (Operation 606).

In an embodiment, a module with the second module name, and a dependency on the named module (i.e., a dependency on the named module identified in Operation 602, which is associated with both the first module name and the second name name), is synthesized (Operation 614). The term "synthesized," as used here, means that the module system generates (or "synthesizes") the synthesized module automatically, i.e., based on executable instructions that are built into the module system. The synthesized module's code is not programmed by a user, and the synthesized module may not necessarily be synthesized in response to any explicit user command. In a module system, because of a synthesized module's dependency on a named module, the named module may be "readable" by a module that consumes the synthesized module and/or its types. A module that "reads" another module is able to refer to the other module's types. The types may be said to be "visible" to code in the consuming module. Regardless of readability of a given module, the visible types in that module may be limited only to those that are exposed to other modules. Readability and/or visibility may be determined during resolution of a module dependency graph.

In an embodiment, the type of dependency of the synthesized module on the named module (i.e., the named module associated with both the first module name and the second module name) depends on the contents of the named module. The discussion herein generally assumes that the named module exposes types and accordingly exposes an application programming interface (API) for accessing those types. However, the named module may not expose an API. For example, the named module may include native code, a command line toolset, or some other type of code for which an API is not exposed to other modules. If the named module exposes an API, the dependency may be made transitive. As used here, the term "transitive" means that any module that depends on the synthesized module also gains implied readability of the named module, as described above. However, if the named module does not expose an API, the dependency may not be made transitive. Making the dependency non-transitive may ensure that the named module is included in the module dependency graph, without providing implied readability to consumers of the synthesized module. In a Java environment, a transitive dependency may be declared with the "requires transitive" keywords.

In an embodiment, in addition to depending on the named module, the synthesized module includes metadata associated with the named module. For purposes of this discussion, "metadata" refers to annotations, flags, and/or other descriptive data associated with the module. For example, metadata associated with the named module may indicate that the named module and/or a particular name associated with the named module is deprecated. If a named module is deprecated, use of its types is discouraged. However, if a particular name is deprecated, use of that name may be discouraged without discouraging use of the named module's types. Logically, if the named module and/or its name is deprecated, then a synthesized module that depends on the named module may also be considered deprecated. Accordingly, the same metadata may be associated with the synthesized module. In a Java environment, deprecation may be indicated using the annotation "@Deprecated." The annotation "@Deprecated" may be included in the synthesized module. Alternatively or in addition, even if the named module and/or its name was not previously deprecated, its name may be considered deprecated (and its metadata updated accordingly) based on the fact that it has been renamed.

As discussed above, a name associated with a named module may be deprecated without deprecating the named module itself. For example, a named module may be an incubator module. For purposes of this discussion, the term "incubator module" refers to a module that includes a feature that is not final, i.e., still under development and not yet sufficiently proven/tested to be considered final. In a Java environment, an incubator module that is part of the Java Development Kit (JDK) may be identified based a prefix of "jdk.incubator" in the module name. This module name prefix (or some other indication that the module is an incubator module) may be treated as metadata and included in the synthesized module, so that consumers of the synthesized module are warned or otherwise informed that their code depends on an incubator module. Incubator modules may be identified in many different ways. An incubator module and/or a name associated with the incubator module may also be deprecated. When an incubator module is converted to a final form, it may be renamed, and the old name may be considered deprecated. If the new name is final, the new name may not be considered deprecated. As long as the declared types of the incubator module are not also changed when it is renamed, renaming modules using synthesized modules, as discussed herein, may allow early adopters to write code that consumes incubator modules, without having to rewrite module dependencies if the incubator module is renamed during development and/or when the incubator module is made final.

While examples above relate to deprecation and incubator modules, many other types of metadata associated with the named module may be associated with the synthesized module, and embodiments should not be considered limited to deprecation and/or incubator modules.

4. Illustrative Examples

Detailed examples are described below for purposes of clarity. Specifically, FIGS. 8A-8F illustrate examples of renaming modules in accordance with one or more embodiments. Components and/or operations described below should be understood as specific examples which may not be applicable to certain embodiments. Accordingly, components and/or operations described below should not be construed as limiting the scope of any of the claims.

Figure 8A:
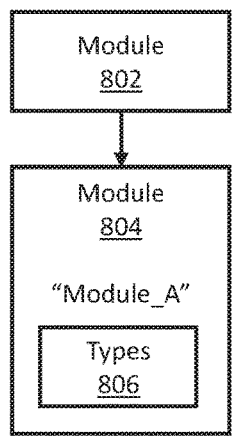
FIGS. 8A-8F illustrate examples of renaming modules in accordance with one or more embodiments.

FIG. 8A illustrates a module 802 that depends on module 804, initially named "Module_A," and consumes its types 806. In the following examples, "Module_A" is to be renamed as "Module_B." Subsequently, "Module_B" is to be renamed as "Module_C."

Figure 8B:
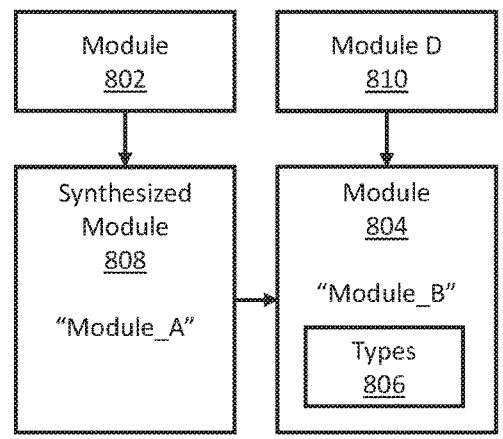

In an embodiment, when a module is renamed, the synthesized module is associated with the old module name. FIG. 8B illustrates that to rename "Module_A" to "Module_B," module 804, previously named "Module_A," now has the name "Module_B" and retains its types 806. A synthesized module 808 is named "Module_A" and depends transitively on module 804 by name. Thus, module 802 does not need to be rewritten; its references to types 806 of "Module_A" will resolve successfully due to the transitive dependency of the synthesized module 808 on the named module 804, even though module 804 is now associated with a new name. A different module 810 may consume the types 806 by referencing module 804 using the new name.

Figure 8C:
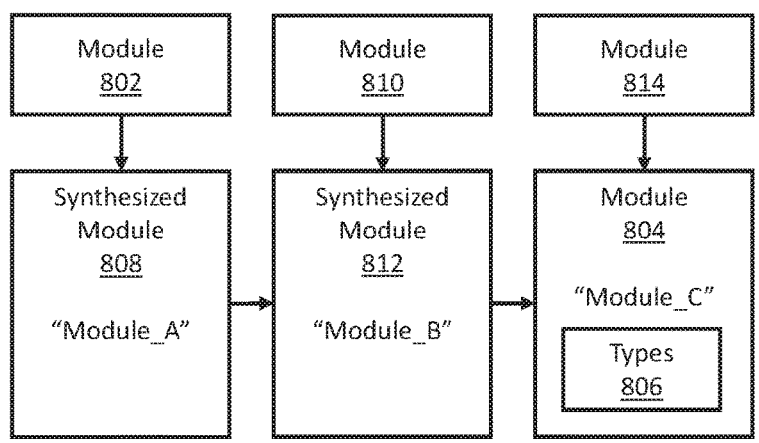

In FIG. 8C, "Module_B" has been renamed to "Module_C." Module 804, previously named "Module_B" (and before that, named "Module_A") now has the name "Module_C" and retains its types 806. A synthesized module 812 is named "Module_B" and depends transitively on module 804 by name. Thus, neither module 802 nor module 810 need to be rewritten, even though module 804 is now associated with yet another new name. The transitive dependency of the synthesized module 812 on module 804 by name, combined with the transitive dependency of the synthesized module 808 on synthesized module 812 by name, ensures that the named module 804 remains readable by module 802, and its exposed types 806 remain visible to module 802. A different module 814 may consume the types 806 by referencing module 804 using the new name.

Figure 8D:
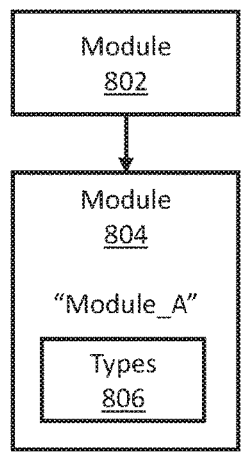
Figure 8E:
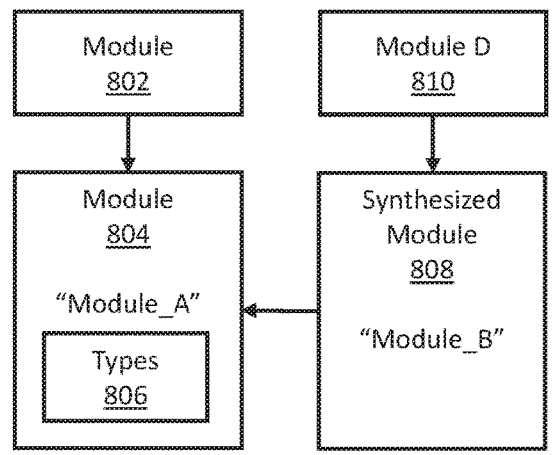

Alternatively, in an embodiment, when a module is renamed, the synthesized module is associated with the new name. FIG. 8D illustrates the same starting point as FIG. 8A. In this example, as illustrated in FIG. 8E, when "Module_A" is renamed to "Module_B," the named module 804 retains the name "Module_A" and its types 806. A synthesized module 808 is named "Module_B" and depends transitively on module 804 by name. Module 802 does not need to be rewritten. In addition, if a different module 810 depends on the synthesized module 808 using the new name, its references to the types 806 of "Module_A" will resolve successfully due to the transitive dependency of the synthesized module 808 on the named module 804.

Figure 8F:
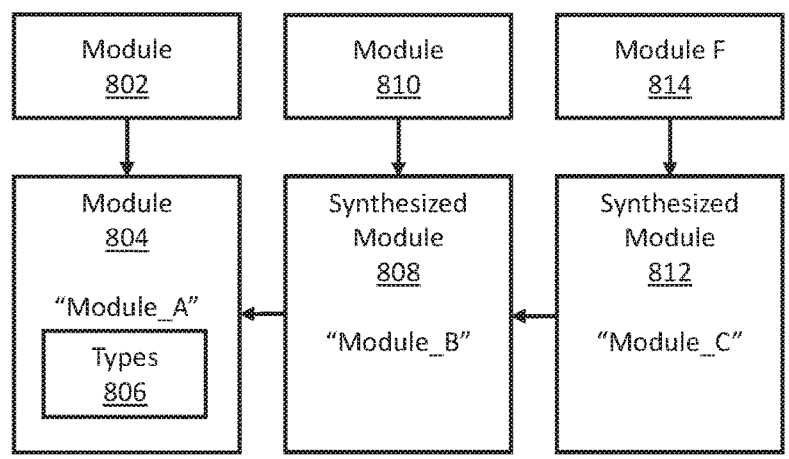

In FIG. 8F, "Module_B" has been renamed to "Module_C." The named module 804 continues to retain the name "Module_A" and the types 806. A synthesized module 812 is named "Module_C" and depends transitively on module 808 by name. Thus, neither module 802 nor module 810 need to be rewritten. In addition, if another module 814 depends on the synthesized module 812 using the new name, its references to the types 806 of "Module_A" will resolve successfully, due to the transitive dependency of the synthesized module 812 on module 808, combined with the transitive dependency of the synthesized module 808 on synthesized module 804.

In both examples above (i.e., the example illustrated in FIGS. 8A-8C and the example illustrated in FIGS. 8D-8F), renaming a module results in synthesizing a new module, with either the new name or the old name. In both examples, the types 806 may be accessed by depending on either module. Thus, a particular module, which was previously identified and referenced by one name, is now identified and referenced by two or more names (depending on how many times the module is renamed).

In an embodiment, renaming modules using techniques described above allows a module system to support module renaming without requiring other modules to be rewritten. Specifically, the renaming occurs without breaking any dependencies in legacy consumers, because consumers of the renamed module, which was previously identified and referenced by the old name, do not need to be aware of the renaming. On the other hand, the new name is available for new or rewritten consumers to depend on. Approaches described above may allow the module system to support renaming with minimal overhead, avoiding the complications of tracking multiple names or aliases used by a single module.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Micro services may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
    determining that a first module is declared with a corresponding first module name;
    determining that the first module, with the corresponding first module name, is also associated with a second module name;
    responsive to determining that the first module is associated with the second module name:
        synthesizing a second module declared with the second module name;
        defining a first dependency of the second module, with the second module name, on the first module with the first module name,
    wherein the first dependency of the second module is a transitive dependency based on a determination that the first module exposes an application programming interface (API).

2. The medium of claim 1, wherein determining that the first module is associated with the second module name is based on identification of the second module name in a source code in which the first module is declared.

3. The medium of claim 1, wherein determining that the first module is associated with the second module name is based on identification of the second module name in a module descriptor of the first module.

4. The medium of claim 1, wherein determining that the first module is associated with the second module name is based on a response to a query for a module name history associated with the corresponding first module name, the response comprising the second module name.

5. The medium of claim 1, wherein determining that the first module is associated with the second module name comprises determining that the first module was declared with the second module name prior to a modification in which the first module was declared with the first module name.

6. The medium of claim 1, wherein synthesizing the second module is performed only if any other module includes a second dependency comprising the second module name.

7. The medium of claim 1, the operations further comprising:
    detecting addition, at runtime, of a third module that includes a second dependency comprising the second module name,
    wherein synthesizing the second module is performed further responsive to detecting addition of the third module.

8. The medium of claim 1, the operations further comprising:
    detecting that a third module includes a second dependency comprising the second module name; and
    allowing, based on the first dependency of the second module and the second dependency of the third module, the third module to access types from the first module.

9. The medium of claim 1, the operations further comprising:
    detecting that a third module includes a second dependency comprising the corresponding first module name; and
    allowing, based on the second dependency of the third module, the third module to access types from the first module.

10. The medium of claim 1, wherein the second module does not expose any elements of its own and does not include any dependencies other than the first dependency.

11. The medium of claim 1, the operations further comprising:
    generating an error in response to determining that a third module is declared with a second module name that is identical to the second module name associated with the first module.

12. The medium of claim 1, the operations further comprising:
    generating an error in response to determining that the second module name associated with the first module is identical to a second module name declared for a third module.

13. The medium of claim 1, wherein synthesizing the second module is performed in response to determining, at runtime, that the first module is associated with the second module name.

14. The medium of claim 1, the operations further comprising:
    associating, at runtime prior to synthesizing the second module, the first module with the second module name.

15. The medium of claim 1, wherein synthesizing the second module is performed during a compilation process in response to determining, during the compilation process, that the first module is associated with the second module name.

16. A non-transitory computer readable medium comprising instructions which, when executed by one or more hardware processors, cause performance of operations comprising:
- determining that a first module is declared with a corresponding first module name;
- determining that the first module, with the corresponding first module name, is also associated with a second module name;
- responsive to determining that the first module is associated with the second module name:
  - synthesizing a second module declared with the second module name;
  - defining a first dependency of the second module, with the second module name, on the first module with the first module name,
- wherein synthesizing the second module comprises:
  - identifying metadata associated with the first module and applicable to the first module; and
  - associating the metadata with the second module to make the metadata applicable to the second module.

17. A non-transitory computer readable medium comprising instructions which, when executed by one or more hardware processors, cause performance of operations comprising:
- determining that a first module is declared with a corresponding first module name;
- determining that the first module, with the corresponding first module name, is also associated with a second module name;
- responsive to determining that the first module is associated with the second module name:
  - synthesizing a second module declared with the second module name;
  - defining a first dependency of the second module, with the second module name, on the first module with the first module name;
- determining, based on metadata associated with the second module, that one or more of the first module and the second module is deprecated.

18. A method comprising:
- determining that a first module is declared with a corresponding first module name;
- determining that the first module is associated with a second module name;
- responsive to determining that the first module is associated with the second module name:
  - synthesizing a second module declared with the second module name;
  - defining a first dependency of the second module, with the second module name, on the first module with the first module name,
- wherein the first dependency of the second module is a transitive dependency based on a determination that the first module exposes an application programming interface (API), and
- wherein the method is performed by at least one device comprising a hardware processor.

19. A system comprising:
- one or more hardware processors; and
- one or more one or more non-transitory computer-readable media storing instructions, which when executed by the one or more hardware processors, cause execution of operations comprising:
  - determining that a first module is declared with a corresponding first module name;
  - determining that the first module is associated with a second module name;
  - responsive to determining that the first module is associated with the second module name:
    - synthesizing a second module declared with the second module name;
    - defining a first dependency of the second module, with the second module name, on the first module with the first module name,
  - wherein the first dependency of the second module is a transitive dependency based on a determination that the first module exposes an application programming interface (API).

* * * * *

UNITED STATES PATENT AND TRADEMARK OFFICE
CERTIFICATE OF CORRECTION

PATENT NO. : 10,346,225 B2
APPLICATION NO. : 15/704156
DATED : July 9, 2019
INVENTOR(S) : Buckley et al.

Page 1 of 1

It is certified that error appears in the above-identified patent and that said Letters Patent is hereby corrected as shown below:

In the Drawings

On sheet 2 of 10, in FIG. 2, under Reference Numeral 200, Line 1, delete "Class Flle" and insert -- Class File --, therefor.

In the Claims

In Column 28, Line 21, in Claim 19, delete "one or more one or more" and insert -- one or more --, therefor.

Signed and Sealed this
Twenty-eighth Day of July, 2020

Andrei Iancu
*Director of the United States Patent and Trademark Office*